United States Patent [19]

Yamamoto et al.

[11] Patent Number: 4,640,454
[45] Date of Patent: Feb. 3, 1987

[54] METHOD FOR PRODUCING EXTRUSION DIE FOR FORMING A HONEYCOMB STRUCTURE

[75] Inventors: Shinichi Yamamoto, Takahama; Toshihiko Ito, Nukata; Mitsuru Asano, Okazaki, all of Japan

[73] Assignee: Nippon Soken, Inc., Nishio, Japan

[21] Appl. No.: 502,656

[22] Filed: Jun. 9, 1983

[30] Foreign Application Priority Data

Jun. 12, 1982 [JP] Japan ................... 57-101083

[51] Int. Cl.⁴ .............. B23P 17/00; B23K 20/02; B23K 20/14
[52] U.S. Cl. .................. 228/161; 228/193; 228/236; 29/163.5 R
[58] Field of Search ........... 228/170, 172, 174, 160, 228/161, 193, 194, 236, 228; 29/163.5 R

[56] References Cited

U.S. PATENT DOCUMENTS

| | | | |
|---|---|---|---|
| 3,613,208 | 10/1971 | Seberg et al. | 29/163.5 R |
| 4,354,820 | 10/1982 | Yamamoto et al. | 29/558 X |
| 4,373,895 | 2/1983 | Yamamoto et al. | 29/163.5 R X |
| 4,382,534 | 5/1983 | Kawn | 228/161 |
| 4,486,934 | 12/1984 | Reed | 228/161 X |

Primary Examiner—Kenneth J. Ramsey
Attorney, Agent, or Firm—Cushman, Darby & Cushman

[57] ABSTRACT

A method for producing an extrusion die which is employed to extrude a ceramic honeycomb structure for use as a catalyst carrier or support for purifying exhaust gases of an automobile or the like, is disclosed. The method comprises the steps of preparing a first and a second metallic block, forming a plurality of discrete feed passages in the first metallic block, forming a grid network of pooling slots from one end surface of the first metallic block or one end surface of the second metallic block, forming a grid network of extrusion slots from one end surface of the second metallic block towards the other opposed end surface thereof to such a depth as to leave an unopened portion along the other opposed end surface of the second metallic block, joining the one end surface of the first metallic block to the one end surface of the second metallic block so that the feed passages, the pooling slots and the extrusion slots are interconnected in order, and removing the unopened portion from the second metallic block so that the extrusion slots are opened.

6 Claims, 21 Drawing Figures

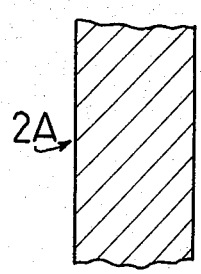
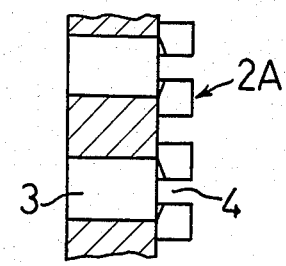
FIG.6(A)  FIG.6(B)
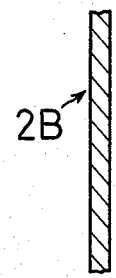
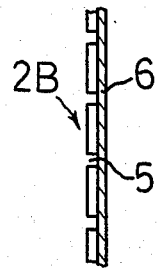
FIG.6(C)  FIG.6(D)
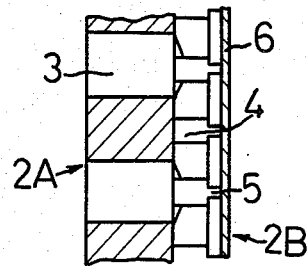
FIG.6(E)
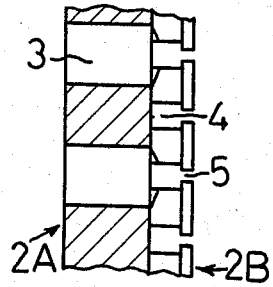
FIG.6(F)

METHOD FOR PRODUCING EXTRUSION DIE FOR FORMING A HONEYCOMB STRUCTURE

BACKGROUND OF THE INVENTION

The present invention relates to a method for producing an extrusion die which is employed to extrude a ceramic honeycomb structure for use as a catalyst carrier or support for purifying exhaust gases of an automobile or the like.

One example of the above described extrusion die is disclosed in U.S. Pat. No. 4,373,895 and comprises a plurality of discrete feed passages which are drilled from one end surface of a die body towards the other end surface thereof separately, interconnected grid-shaped extrusion slots which are formed from the other end surface of the die body and interconnected grid-shaped pooling slots which are positioned between the feed passages and the extrusion slots so as to be interconnected therewith and have a width larger than that of the extrusion slots.

In the above extrusion die, an extrudable material such as ceramic slurry is supplied through the feed passages, termporarily pooled in the pooling slots and then is fed into the extrusion slots. The extrudable material is successively extruded by the extrusion slots to form a ceramic honeycomb structure.

There is disclosed in the above described United States Patent, a method for producing an extrusion die, which comprises the steps of preparing two metallic blocks, forming feed passages from one end surface of a thick plate-shaped first metallic block, forming pooling slots from the other end surface thereof, joining a thin plate-shaped second block to the other end surface of the thick plate-shaped first metallic block by brazing, welding or the like, and forming extrusion slots from the outer end surface of the second metallic block therethrough.

According to this method, the pooling slots can be formed by machining the end surface of the first metallic block so that dimensional accuracy can be improved. However, this method has a problem. Namely, the pooling slots are apt to be deformed due to heat treatment applied when the two metallic blocks are joined to each other. In this case, even if the extrusion slots are formed at predetermined distances on the second metallic block, the extrusion slots do not overlap the pooling slots accurately and they are not completely interconnected with each other. As a result, slurry is partially blocked from smoothly flowing from the pooling slots to the extrusion slots and the thickness of the obtained honeycomb structure becomes non-uniform.

SUMMARY OF THE INVENTION

The method for producing an extrusion die according to the present invention comprises the steps of preparing a first and a second metallic block, forming a plurality of discrete feed passages in the first metallic block, forming a grid network of pooling slots from one end surface of the first metallic block or one end surface of the second metallic block, forming a grid network of extrusion slots from one end surface of the second metallic block towards the other opposed end surface thereof to such a depth as to leave an unopened portion along the other opposed end surface of the second metallic block, joining the one end surface of the first metallic block to the one end surface of the second metallic block so that the feed passages, the pooling slots and the extrusion slots are interconnected in order, and removing the unopened portion from the second metallic block so that the extrusion slots are opened.

In a first type of method according to the present invention, the feed passages are formed in the first metallic block, the pooling slots are formed from one end surface of the second metallic block towards the other opposed end surface thereof to a predetermined depth and the extrusion slots are formed from the bottom portions of the pooling slots, leaving an unopened portion extending along the other end surface of the second metallic block. Then, the end surface of the second metallic block, wherein the pooling slots are formed is joined to one of end surfaces of the first metallic block, wherein the feed passages open. Thereafter, the unopened portion of the second metallic block is removed by a predetermined thickness until the extrusion slots are opened.

In a second type of method according to the present invention, the feed passages and the pooling slots are formed in the first metallic block, and the extrusion slots are formed from one end surface of the second metallic block, leaving an unopened portion. Then, the end surface of the first metallic block, from which the pooling slots are formed and the end surface of the second metallic block, from which the extrusion slots are formed, are joined to each other. Thereafter, the unopened portion of the second metallic block is removed.

One object of the present invention is to provide a method for efficiently and preceisely producing an extrusion die composed of feed passages, extrusion slots, and pooling slots, which is employed to extrude a honeycomb structure.

Another object of the present invention is to provide a method for producing an extrusion die of which the grid-shaped pooling slots and the grid-shaped extrusion slots completely meet each other despite the usage of two separate metallic blocks.

BRIEF DESCRIPTION OF THE DRAWINGS

FIGS. 6(A) to 6(F) show steps in a second embodiment of a method according to the present invention;

DETAILED DESCRIPTION OF EMBODIMENTS

Hereinafter, the present invention will be explained in detail in accordance with embodiments thereof with reference to the accompanying drawings.

Figure 4:
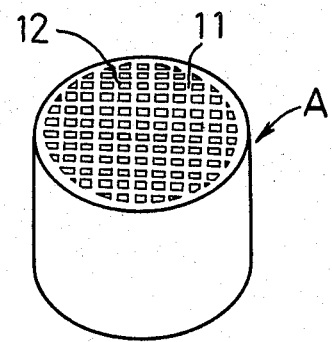
FIG. 4 is a perspective view of a honeycomb structure obtained by means of the extrusion die of the present invention.

The method according to the present invention is employed to produce an extrusion die for extruding a honeycomb structure A provided with a large number of open passages 12 which are defined by thin partition walls 11 as shown in FIG. 4.

Figure 1:
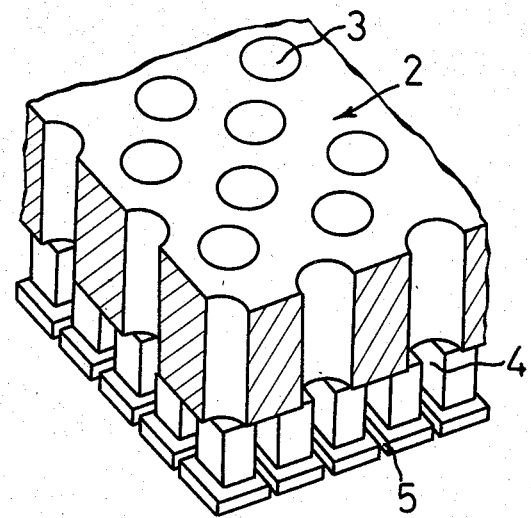
FIG. 1 is a partially sectional perspective view of an extrusion die of the present invention.
Figure 2:
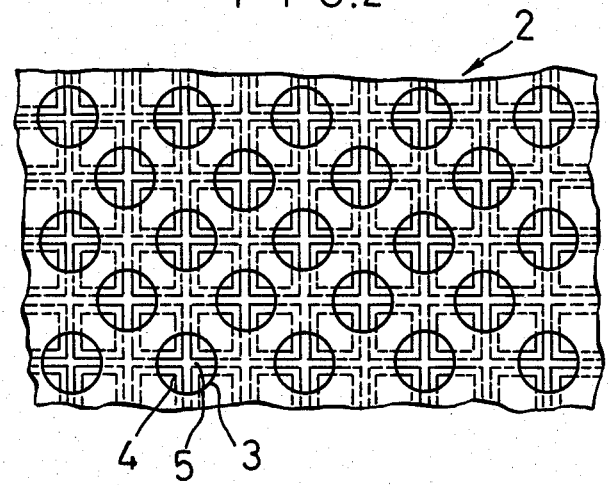
FIG. 2 is a plane view of one portion of the extrusion die shown in FIG. 1.

The structure of the extrusion die will be explained with reference to FIGS. 1 to 3. A plurality of feed passages 3 having a circular cross section is formed from one end surface of a die body 2 towards an opposed end surface thereof to a predetermined depth. From the other end surface of the die body 2 towards the opposed end surface thereof, a grid network of interconnected extrusion slots 5 is formed. A grid network of pooling slots 4 are formed between the feed passages 3 and the extrusion slots 5 so as to overlap the extrusion slots 5. The feed passages 3 are communicated with the pooling slots 4 at alternate intersections thereof. The extrusion slots 5 have the same shape and size as the cross-sectional shape of the partition walls of the honeycomb structure A. The pooling slots 4 have the same shape as that of the extrusion slots 5 but the width of the pooling slots 4 is larger than that of the extrusion slots 5.

A first embodiment of the method for producing the extrusion die having such a structure as described above, will be explained.

Figure 5A:
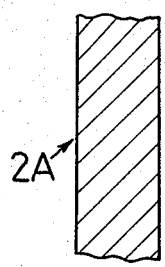
FIGS. 5(A) to 5(F) show steps in a first embodiment of a method according to the present invention for producing the extrusion die shown in FIGS. 1 to 3.
Figure 5B:
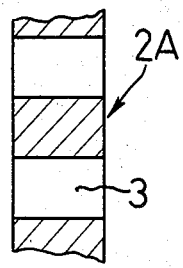
Figure 5C:
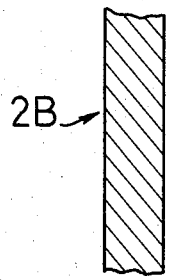

As shown in FIGS. 5(A), 5(C), a thick plate-shaped first metallic block 2A having the same outer shape as that of the die body 2, and a plate-shaped metallic block 2B having the same outer shape as that of the die body 2 and a thickness slightly smaller than that of the metallic block 2A, are prepared.

These blocks 2A, 2B are formed of alloy tool steel, for example.

Figure 5D:
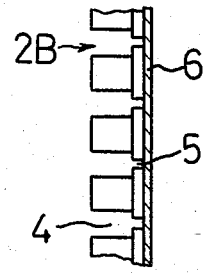

Next, a large number of feed passages 3 are drilled from one end surface of the first metallic block 2A towards the opposed end surface as shown in FIG. 5(B). And as shown in FIG. 5(D), the grid network of pooling slots 4 is formed from one end surface of the second mettalic block 2B towards the opposed end surface to a predetermined depth by electric discharge machining, cutting machining, grinding machining, lap machining or the like, then the grid network of extrusion slots 5 is formed from the bottom position of the pooling slots 4 towards the opposed end surface of the second metallic block 2B to such a predetermined depth leaving unopened portion 6. The extrusion slots 5 are formed by the same method as described above. The integral structure of the second metallic block 2B is held by virtue of the unopened portion 6.

Figure 5E:
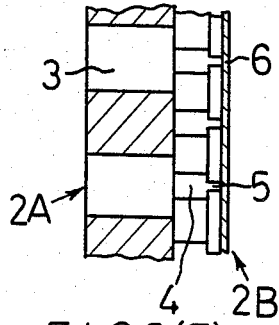

One end surface of the first metallic block 2A from which the feed passages 3 are formed, and the end surface of the second metallic block 2B from which the pooling slots 4 are formed, are joined to each other as shown in FIG. 5(E). The positional relation between the feed passages 3 and the pooling slots 4 is shown in FIG. 2. The first metallic block 2A is joined to the second metallic block 2B by diffusion welding, brazing, ultrasonic welding, electron beam welding, resistance welding or the like.

When the feed passages 3 are drilled from one end surface of the metallic block 2A towards the other end surface thereof, the drill is apt to be bent so that the obtained feed passages are apt to be bent.

Therefore, when the first metallic block 2A is joined to the second metallic block 2B, the end surface from which the feed passages 3 are drilled, is preferably joined to the end surface of the second metallic block 2B.

Figure 5F:
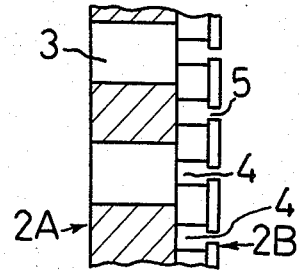

Thereafter, the unopened portion 6 of the second metallic block 2B is removed so that the extrusion slots 5 are opened as shown in FIG. 5(F). The removal of the unopened portion 6 is performed by grinding machining, electric discharge machining or the like. In grinding machining, flashes are sometimes produced in the corner portions of the outlet ends of the extrusion slots 5, so that the flashes must be removed. In electric discharge machining, such flashes are not produced, but a long machining time is required.

FIG. 6 illustrates a second embodiment of the method according to the present invention.

In the second embodiment, feed passages 3 and pooling slots 4 are formed in the first metallic block 2A while extrusion slots 5 are formed in the second metallic block 2B. The end surface of the first metallic block 2A from which the pooling slots 4 are formed, and the end surface of the second metallic block 2B from which the extrusion slots 5 are formed, are joined to each other.

The method of the second embodiment is superior to that of the first embodiment in that contacting area of the first metallic block 2A with the second metallic block 2B of the second embodiment is larger than that of the first embodiment. But in the second embodiment, the feed passages 3 must be formed to a predetermined depth so that the formation of the feed passages 3 is troublesome.

The most suitable method of joining the first metallic block 2A to the second metallic block 2B is diffusion welding.

According to the diffusion welding method, in the joined portions of the first metallic block 2A and the second metallic block 2B, chemical elements of each of the metallic blocks 2A, 2B diffuse into the opposed metallic block so that the metallic blocks 2A, 2B are integrally and strongly joined to each other and an integral structure can be obtained.

The diffusion welding method is performed by means of a high-frequency induction heating type vacuum hot pressing device, for example.

The preferable heating temperature at the welding time, is higher than the recrystallization temperature of any one of the metallic blocks 2A, 2B and lower than the melting point of any one of the metallic blocks 2A, 2B.

The present inventors have welded the first metallic block 2A made of alloy tool steel JIS (Japanese industrial standard) SKD-61 (Cr 5$^w$/o) and the second metallic block 2B made of alloy tool steel JIS SK-5 (Cr 0$^w$/o) by means of the above described hot pressing device.

Figure 7A:
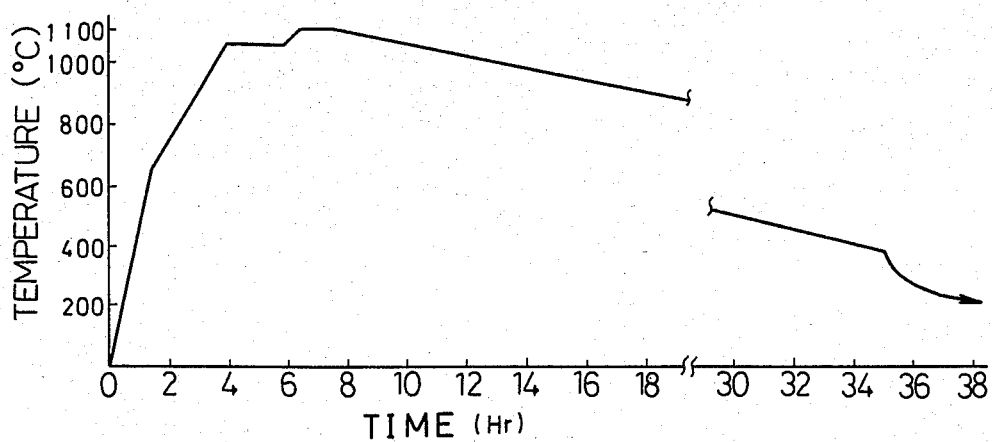
FIGS. 7(A) to 7(C) are graphs showing the conditions of the diffusion welding method.
Figure 7B:
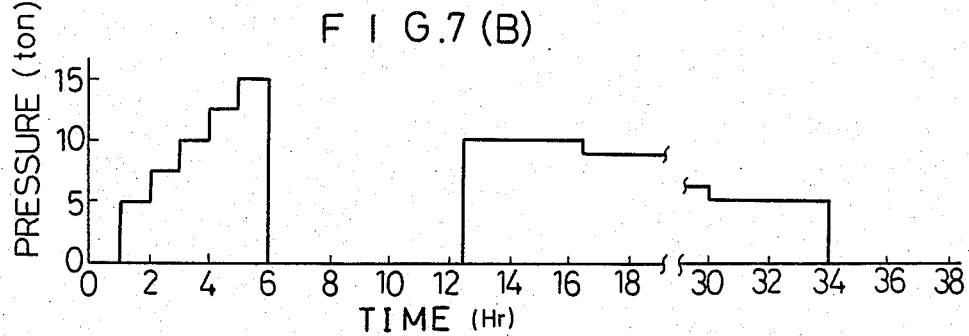
Figure 7C:
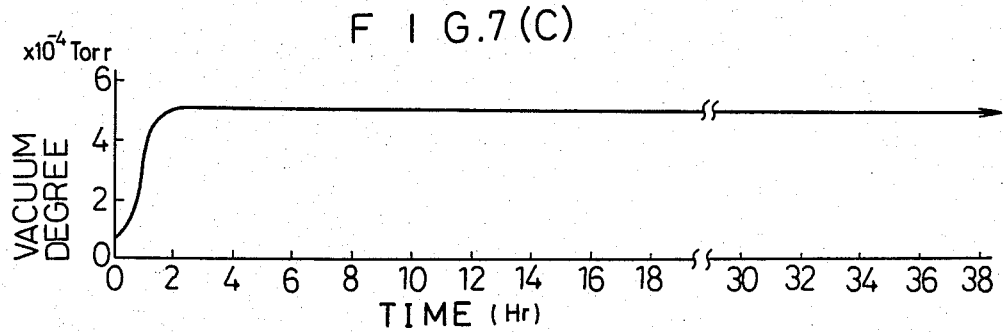

FIGS. 7(A) to 7(C) show the temperature condition, the pressure condition and the vacuum degree within a vacuum chamber of the hot pressing device, respectively. Pressure was released in the middle of the experiment in order to prevent the metallic blocks 2A, 2B from being excesively deformed, then pressure is applied to the metallic blocks 2A, 2B again after a predetermined time interval in order to eliminate thermal deformation thereof.

Figure 3:
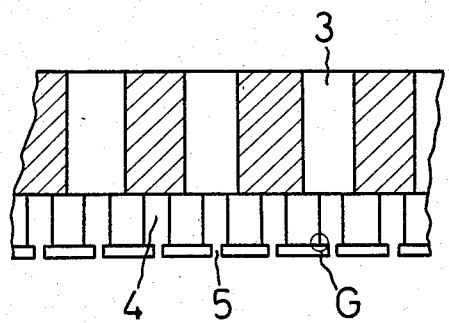
FIG. 3 is a sectional view of one portion of the extrusion die shown in FIG. 1.
Figure 8:
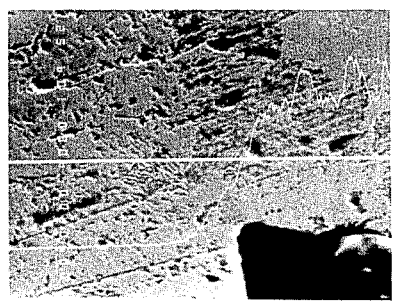
FIG. 8 is an electron microphotograph showing the structure of the joined portion of the obtained extrusion die.
Figure 9:
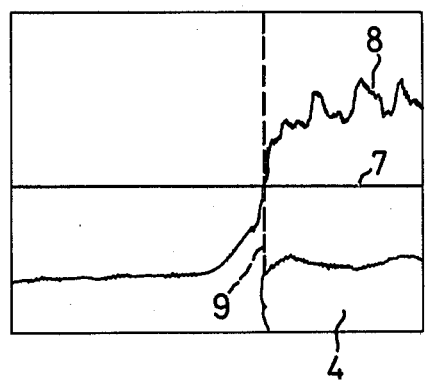
FIG. 9 is a view explaining the structure of FIG. 8.

FIG. 8 is an electron microphotograph of 300 magnifications showing the structure of the joined portion (G) of the extrusion die produced by the method of the second embodiment, shown in FIG. 3. FIG. 9 is a view explaining the structure of FIG. 8. In FIG. 9, the reference numeral 7 designates the electron scanning line, 8 designates the line showing the density distribution of Cr which is measured by X ray microanalyzer, 9 designates the joined portion of the metallic blocks and 4 designates the pooling slot.

As is apparent from the Cr density distribution line 8 of FIG. 9, the density of Cr continuously changes in the joined portion 9. This result shows that chemical elements of each of the metallic blocks 2A, 2B diffuse into the opposed metallic block. As a result, the joined portion 9 of the metallic blocks 2A, 2B has such an integral structure that a boundary line therebetween is not observed.

As described above, according to the present invention, the pooling slots and the extrusion slots are previously formed in a single metallic block or separate metallic blocks, then the metallic blocks are joined to each other so that the feed passages, the pooling slots and the extrusion slots are located at predetermined positions relative to one another. Therefore, slippage of the pooling slots and the extrusion slots on each other does not occur in the method according to the present invention. Consequently, the extrudable material can smoothly flow within the obtained extrusion die so that a honeycomb structure having a uniform wall thickness and excellent dimensional accuracy can be produced by means of the obtained extrusion die.

The present invention is not limited to the above embodiments. Other embodiments are possible. For example, the feed passages 3 may be interconnected with the respective intersecting portions of the pooling slots 4. The first metallic block 2A and the second metallic block 2B may be formed of different materials to each other. The cross-sectional shape of the extrusion slots 5 is not limited to a rectangular shape. A triangular shape or other shape corresponding to the desired honeycomb structure is possible. The pooling slots 4 and the extrusion slots 5 may be formed by metal slitting sawing, ultrasonic machining or like. And the unopened portion 6 of the second metallic block 2B may be removed by cutting machining, lap machining or the like.

What is claimed is:

1. A method for producing an extrusion die adapted to receive a plurality of feeds of an extrudable material, distribute and pool those feeds and extrude the distributed, pooled extrudable material as a grid,
this method comprising:
    (a) providing a first metallic block having an inlet face and an outlet face separated from one another by the thickness of said first metallic block;
    (b) providing a second metallic block having an inlet face and an opposite face separated from one another by the thickness of said second metallic block;
    (c) forming a plurality of transversally spaced feed passages through said first metallic block, these feed passages extending at least part-way through the thickness thereof so as to extend communication of the inlet face thereof towards the outlet face thereof;
    (d) forming a grid network of extrusion slots in said second metallic block incompletely through the thickness thereof, from said inlet face thereof, so as to leave intact a layer of the second metallic block adjoining said opposite face thereof;
    (e) forming a grid network of pooling slots in at least one of:
        (i) the first metallic block incompletely through the thickness thereof from said outlet face thereof, to such depth and arrangement that each such pooling slot communicates with at least one said feed passage; and
        (ii) the second metallic block incompletely through the thickness thereof from said inlet face thereof, each said extrusion slot being so located in said second metallic block so as to be capable, upon facewise juxtaposition of said first and second metallic blocks, of aligning with a respective pooling slot as a continuation thereof thicknesswise of the resulting composite and of communicating with at least one said feed passage in such a sense as to be fed thereby, and each pooling slot being wider than each respective extrusion slot;
    (f) placing said outlet face of said first metallic block in facewise juxtaposition with said inlet face of said second metallic block with respective said extrusion slots in alignment with respective said pooling slots as respective continuations thereof thicknesswise of the resulting composite, and each feed passage in communication with a plurality of said pooling slots in such a sense as to feed such pooling slots;
    (g) while maintaining such juxtaposition, heating said first and second metallic blocks under such conditions as to join said outlet face of said first metallic block with said inlet face of said second metallic block as a composite block, said diffusion welding being performed in two stages within a vacuum chamber of a hot pressing device, in each of which stages said blocks are pressed together, with such pressure being relieved between said stages in order to prevent excessive deformation of said blocks; and
    (h) thereafter, severing said intact layer from said second metallic block thereby defining an outlet face of the composite block, through which face said extrusion slots open as a grid.

2. The method of claim 1, wherein:
in conducting steps (d) and (e) the respective extrusion slots and pooling slots are caused to intersect one another intermediate the thickness of said second metallic block.

3. The method of claim 1, wherein:
in conducting step (c), said feed passages are formed incompletely through the thickness of said first metallic block; and
in conducting step (e), said network of pooling slots is formed at least partly in said first metallic block through said outlet face thereof, to such a depth as to cause said network of pooling slots to intersect with said feed passages.

4. The method of claim 1, wherein:
in conducting steps (d) and (e) said pooling slots and said extrusion slots are formed by at least one of electric discharge machining, cutting machining, grinding machining, lap machining, end milling, metal slit-sawing and ultrasonic machining.

5. The method of claim 1, wherein:
in conducting step (g), said diffusion welding is performed by joining said two metallic blocks under pressure at a temperature higher than the crystallization temperature of any one of said first and said second metallic blocks and lower than the melting point of any one of said first and said second metallic blocks.

6. The method of claim 1, wherein:
in conducting step (h) said layer is severed by at least one of grinding machining, cutting machining, electric discharge machining and lap machining.

* * * * *